United States Patent

[11] 3,552,409

| [72] | Inventors | Raymond P. Michnay<br>Wiesbaden, Germany;<br>Ivan R. Johnson, Toorak, Victoria,<br>Australia |
|---|---|---|
| [21] | Appl. No. | 754,912 |
| [22] | Filed | Aug. 23, 1968 |
| [45] | Patented | Jan. 5, 1971 |
| [73] | Assignee | General Motors Corporation<br>Detroit, Mich.<br>a corporation of Delaware |

[54] GOVERNOR
10 Claims, 4 Drawing Figs.

[52] U.S. Cl. .................................................. 137/54,
137/56
[51] Int. Cl. ..................................................... G05d 13/30
[50] Field of Search ........................................... 137/54, 56

[56] References Cited
UNITED STATES PATENTS

| 2,883,178 | 4/1959 | Battenberg et al............ | 137/56X |
| 2,889,844 | 6/1959 | McFarland et al............ | 137/54 |
| 3,279,486 | 10/1966 | Duffy et al. .................... | 137/56X |

FOREIGN PATENTS

| 755,628 | 9/1944 | Germany...................... | 137/56 |

Primary Examiner—Robert G. Nilson
Attorneys—E. W. Christen and A. M. Heiter

ABSTRACT: The governor shown has a high-speed valve which receives fluid from a source and is subject to centrifugal force to supply a high level governor pressure to the low-speed governor valve which at high speeds merely connects the high-speed governor pressure to the governor line and at low speeds regulates the governor pressure at a lower value for low-speed control. Both valves are mounted substantially radially in parallel stepped through bores in a single valve body so that both bores are simultaneously drilled and simultaneously finished. The high-speed valve is a small diameter hollow movable valve element of extremely lightweight. The low-speed valve is a large diameter solid movable valve element to provide the additional weight in a one-piece valve element.

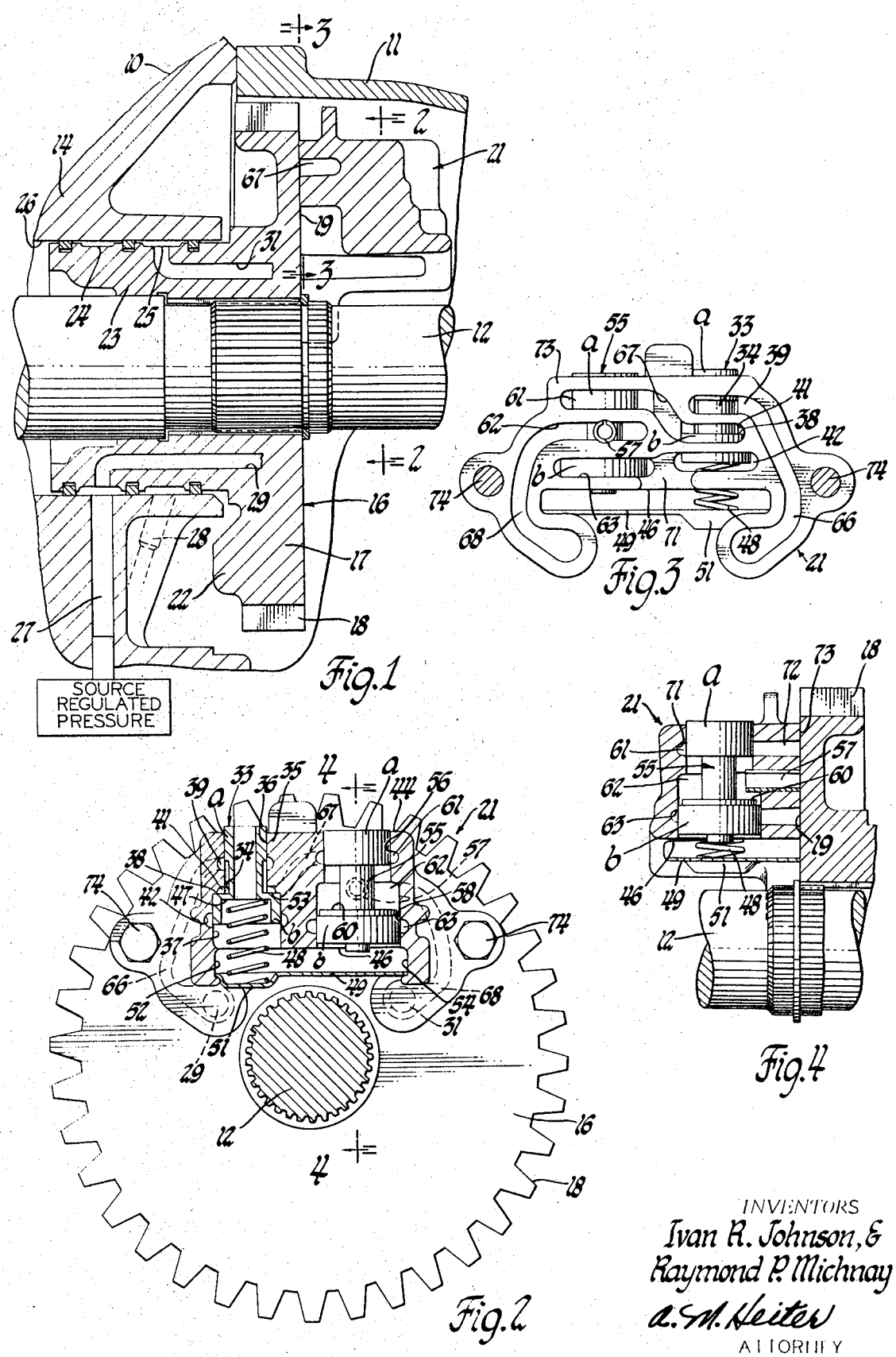

GOVERNOR

This invention relates to transmission controls and particularly to an improved hydraulic governor control system.

This invention provides a simple low cost governor construction providing a stepped governor pressure curve with increasing speed. The governor body is fastened to the sidewall of a disc in the transmission which may function as a parking lock gear, a drive gear, hub, or drum portion of the transmission. The governor is of the type having a high-speed valve which regulates a high-speed governor pressure which is fed through a low-speed valve without regulation in the high-speed range to the governor line. In the low-speed range the low-speed valve regulates the high-speed pressure to provide a parabolic low-speed governor pressure in the low range so that the governor provides, by the combination of the low-speed pressure in the low range and the high-speed pressure in the high range, a governor pressure having a rapidly increasing low range pressure and still maintaining high-speed pressure at a practical value. The governor valve body has two stepped bores close to and parallel to each other for the valves. When the valve body is assembled on the disc the valves are aligned with a radius between the valves. The high-speed valve has a small hollow lightweight element biased by centrifugal force and a spring to the position connecting the feed to the central regulated pressure port and biased by this regulated pressure inwardly to an exhausting position to provide the high-speed governor pressure. The low-speed valve has a large heavy element biased outwardly by centrifugal force and inwardly by governor pressure to regulate the high-speed governor pressure to the low-speed governor pressure in the low-speed range and in the high-speed range moves outwardly to directly connect the high-speed governor pressure from the high-speed valve to the governor line. This simplified low cost valve structure is made from a one-piece die casting having the passages cast therein. The valve bores being parallel, extending completely through the valve body and stepped in the same direction are drilled and finished at the same time. The simple one-piece valve elements are then inserted in these stepped bores and the spring placed to engage the high-speed valve and held in place by the simple sheet metal abutment plate.

An object of this invention is to provide an improved lightweight simplified dual valve hydraulic governor construction providing a governor pressure curve increasing with increasing speed over the full range of transmission operation.

Another object of this invention is to provide a simplified dual valve governor having two parallel bores stepped with the large and the small ends of both valves being at the same side of the valve body.

Another object of this invention is to provide an improved and simplified dual valve governor including a valve body fixed to a rotating disc and having two parallel stepped bores each having a central longitudinal axis extending parallel to each other and a radius of the disc and completely through the valve body with the large ends of the bores nearer the axis of rotation and having stepped one-piece valve elements in the bores.

Another object of this invention is to provide an improved simplified dual valve governor having two parallel stepped bores with valve element therein and attached to the side face of a disc member in a transmission.

Another object of this invention is to provide in an improved simplified dual valve governor rotating about an axis, a high-speed lightweight hollow stepped valve element and a solid heavier stepped valve element in parallel radial bores on the same side of the axis of rotation.

These and other objects of the invention will be more apparent from the following drawings and description of a preferred embodiment.

FIG. 1 shows a partial sectional and schematic view of a portion of a transmission illustrating the governor.

FIG. 2 is a sectional view of the governor and disc on the line 2—2 of FIG. 1.

FIG. 3 is a sectional view of FIG. 1 on the line 3—3.

FIG. 4 is a sectional view of FIG. 2 on the line 4—4.

This governor is particularly suitable for use in automatic transmissions having fluid control systems for controlling the transmission ratio changes automatically in accordance with vehicle speed. One type of transmission in which this governor system is used is shown in application Ser. No. 759,671 filed Sept. 13, 1968 by Raymond P. Michnay, Charles R. Moore and Gilbert K. Hause entitled "Transmission." FIG. 1 shows the rear portion of the transmission housing 10 with the extension housing 11 attached thereto. The output shaft 12 is rotatably supported by a bearing not shown in the rear wall of the housing 10. The parking gear 16 has the disc portion 17 having peripheral teeth 18, a locating pad portion 19 for the governor assembly 21 and an unbalanced weight 22 to balance the governor assembly. The sleeve portion 23 of the parking gear member 16 has a pair of transfer lands 24 and 25 each consisting of a groove with a seal at each side engaging the inner bore 26 in the wall 14. The feed passage 27 and the governor pressure passage 28 in wall 14 feed transfer lands 24 and 25 and are respectively connected by straight axial passages 29 and 31 to the opposite end of the parking gear member 16 and the face at the pad portion 19 in the location shown in FIG. 2.

The governor assembly 21, as best shown in FIG. 2, has a small diameter lightweight high-speed valve element 33 having a small land $a$ and a large land $b$ with a groove 34 therebetween located in a stepped bore in valve body 35. The bore has a small diameter portion 36 and a large diameter portion 37 with intermediate step shoulder 38 between these bore portions. The valve bore has an inlet port 39 in the small bore portion and a regulated pressure port 41 at the step between the bore portion and an exhaust port 42 in the large bore portion 37.

It should be noted that the small bore 36 extends to the end face 44 and that the large bore 37 extends to the end face 46. The valve element 33 is hollow and has substantially the same thickness throughout its length so there is a central abutment shoulder 47 for the valve spring 48 which also abuts a sheet metal abutment strip 49 having a recessed portion 51 to laterally locate the spring and having ends fitting in a seat slot 52 and 54 at each side of the valve body. The strip 49 is laterally retained between disc 16 and closed ends of the slots at the opposite side of the valve body.

When the radially outward movement of the valve element 33 is limited by engagement of end face 53 on land $b$ of valve element 33 with shoulder 38 the inlet port 39 is connected to high-speed governor port 41. The port 41 reduces the area of shoulder 38 to a narrower semicircle so even if face 53 seats in sealing relation on shoulder 38 the pressure acts on some unbalanced area to initiate regulation.

A large diameter comparatively heavy solid one-piece low-speed valve element 55, having small land $a$ and a large land $b$, is located in a stepped bore having a small portion 56 and a large diameter portion 58. The low-speed valve bore has an inlet port 61 in the small diameter bore portion, a governor pressure port 62 at the step and a vent port 63 in the large diameter portion of the bore. The abutment strip 49 retains valve 55 in the bore and a spring pin 57 limits the radial outward movements of the valve 55. It will be appreciated that the shoulder 38 and the spring pin 57 prevent both valves from moving out of the bore in the opposite direction. The feed passage 29 is connected by a recess feed passage 66 in the valve body to the inlet port 39. The high-speed governor pressure port 41 is connected by passage 67 to the low-speed valve inlet port 61. The combined governor pressure port 62 is connected by recess passage 68 to the governor passage 31. When the stop portion 60 of land $b$ of valve element 55 engages the spring pin 57 radially outward movement of the valve element is stopped in a position connecting inlet port 61 to governor pressure port 62.

When fluid under pressure is supplied to the feed or inlet port 39 of the high-speed valve 33 and the shaft 12, disc 16 and governor body 21 are rotating, the spring 48 and centrifugal force biases the valve element outwardly to an open flow position shown, and the feed pressure is connected through inlet port 39 and groove 34 to the high-speed governor pressure port 41 and acts on the unbalanced area of the large land *b* to bias the valve element in a closing and exhausting direction venting fluid to exhaust port 42 to regulate at port 41 a high-speed governor pressure. This governor pressure in a low-speed range has a substantially flat governor pressure curve with relation to speed and then in the high-speed range provides a governor pressure increasing with increasing speed. The low-speed governor valve 55 functions in the low-speed range where the high-speed governor pressure has a low rate of change with changing speed. This valve under the influence of an opening bias by centrifugal force and a closing bias by the action of the governor pressure on the unbalanced area of land *b* of the valve element 55 regulates the low-speed governor pressure supplied to port 62 and passage 67, 31 at a value increasing with increasing speed. When the speed reaches the initial point of the high-speed range the land *b* engages the spring pin and the low-speed valve 55 ceases to regulate and merely transmits high-speed governor pressure from the high-speed valve via passage 67, port 61 through the bore of the low-speed valve to the governor passage 67, 31.

The valve body is made from a one-piece casting having a recess tapered for draft as shown in FIGS. 3 and 4 for each of the ports 39, 41, 42, 61, 62 and 63. Each port has a semicircular end portion 71 and draft tapered sides 72 extending to the side face 73 which is sealed to the pad portion 19 of disc 16 by fasteners 74 to seal and close all the ports and recess passages, the feed passage 66, the transfer passage 67 and the governor pressure passage 68. The vent ports 42 and 63 are connected by the vent opening 71 to the interior of the casing.

Then the two parallel bores are each drilled by a stepped drill. This in a low cost process because the bores are parallel, extend completely through the valve body and the small end of the bores is at the same side of the valve body. The bores are similarly finished.

The valve elements and the spring are then placed and the abutment strip slid transversely into position in its retaining groove.

The valve body is then secured in position by fasteners 74. A gasket may be used to seal the body face 73 to pad 19.

It will be appreciated that the invention includes modifications of the disclosed preferred embodiment.

We claim:

1. In a control system; a rotary member mounted for rotation about an axis; a source of fluid, a valve body secured to said member and having radially inner and outer sides and a plurality of substantially radial stepped valve bores located in closely spaced side by side substantially parallel relation to each other and each extending completely through the valve body from the radially inner to the radially outer side and being freely open to exhaust at both said sides and having an intermediate step portion, a large diameter bore portion extending from said step portion to the radially inner side and a small diameter bore portion extending from said step portion toward the radially outer side; said source being connected to one of said bores; first valve means in said one bore having a large land and a small land fitting said large and small bore portions of said one bore and an intermediate step and responsive to centrifugal force for regulating fluid pressure to oppose centrifugal force in said step portion of said one bore acting on said step portion of said first valve means at a first governor pressure proportional to speed and supplying said first governor pressure to the other of said bores; second valve means in said other bore responsive to centrifugal force and having a large land and a small land fitting said large and small bore portions of said other bore and an intermediate step and regulating fluid pressure in said step portion of said other bore acting on said step of said second valve means to oppose centrifugal force an supplying second governor pressure having a modified pressure speed relationship relative to said first governor pressure.

2. In a control system; a rotary member mounted for rotation about an axis having a side face; a source of fluid, a valve body secured to said member and having a plurality of parallel substantially radially located stepped valve bores each extending through the valve body from the radially inner to the radially outer side and having a large diameter bore portion at the radially inner side and a small diameter at the radially outer side; first valve means in one of said bores for receiving fluid from said source and responsive to centrifugal force for supplying fluid at a governor pressure proportional to speed to the other of said bores; second valve means in the other of said bores for modifying the pressure speed relationship of said governor pressure and said first valve means having a valve element having a large land fitting said large inner bore portion and a small land fitting said small outer land and a groove therebetween and being hollow to provide a minimum weight valve element and said second valve means having a valve element having a large land fitting said large bore portion and a small land fitting said small bore portion and a groove therebetween and being solid to provide a maximum weight valve element.

3. In a control system; a rotary member mounted for rotation about an axis having a side face; a source of fluid, a valve body secured to said member and having a plurality of parallel substantially radially located stepped valve bores each extending through the valve body from the radially inner to the radially outer side and having a large diameter bore portion at the radially inner side and a small diameter at the radially outer side; first valve means in one of said bores for receiving fluid from said source and responsive to centrifugal force for supplying fluid at a governor pressure proportional to speed to the other of said bores; second valve means in the other of said bores for modifying the pressure speed relationship of said governor pressure and said first valve means having a one-piece first valve element having only a large end land fitting said large inner bore portion and a small end land fitting said small outer bore portion of said one bore and a smaller connecting portion providing a groove between said lands and being hollow to provide a minimum weight valve element and said second valve means having a valve element having only a large end land fitting said large bore portion and a small end land fitting said small bore portion of said other bore and a smaller intermediate connecting portion providing a groove between said lands and being solid to provide a maximum weight valve element.

4. The invention defined in claim 3 and said first and second valve means each including an inlet port in the small diameter bore portion, a vent port in the large diameter bore portion and a regulated pressure port substantially between said bore portions that is not closed by the valve element in the respective bores in any position, said source being connected by a passage to said first valve means inlet port, said first valve means regulated pressure port being connected by a passage to said second valve means inlet port, a governor line in said rotary member said second valve means regulated pressure port being connected by a passage to said governor line.

5. The invention defined in claim 4 and said ports and passages being recesses in said valve body enclosed and sealed by said side face of said rotary member.

6. In a control system; a rotary member having a side face portion mounted for rotation about an axis; a supply fluid passage in said member extending to said side face; a governor pressure fluid passage in said member side face; a valve body secured to said side face having a first stepped bore and a second stepped bore located closely together and parallel to a radius of the side face; both bores having the larger diameter portion adjacent the axis and the smaller diameter portion remote from the axis; said first stepped bore having an inlet port in the smaller portion, a regulated pressure port at the step and a vent port in the larger portion; said second bore having an inlet port in the small portion, a regulated pressure port at the step and a vent port in the large portion; supply passage means in said valve body connecting said supply passage in said side face to said inlet port of the small bore; a transfer passage connecting said regulated pressure port of the small bore to the inlet port of the large bore; a passage connecting said regulated pressure port of the large bore to said governor passage in said side face; a hollow lightweight valve member having a land fitting each bore portion of said first bore and a groove therebetween operative for connecting said inlet port to said regulated pressure port and said regulated pressure port to said vent port; spring means and centrifugal force acting on said hollow valve element to bias said valve element to the opened position connecting said inlet port to said regulated pressure port and the regulated pressure acting on the unbalanced area between said lands to move said valve inwardly to connect said regulated pressure port to said vent port; a solid heavy one-piece valve element having a small land in said smaller portion of said large bore and a larger land in the larger portion of said large bore; centrifugal force acting on said second valve element to move it outwardly to connect said inlet port to said regulated pressure port and the regulated pressure acting on the unbalanced area between said lands to move said valve to connect the regulated pressure port to said vent port.

7. In a control system; a fixed housing having a portion with a central bore; a shaft rotatably mounted in said bore; a rotary member fixed to said shaft having a sleeve portion located within said bore and a disc portion; a supply fluid passage in said fixed housing and member and a governor pressure fluid passage in said fixed housing and member and a governor pressure fluid passage in said fixed housing and member both having fluid transfer means between the fixed housing and said sleeve portion of said member to connect said supply and governor passages; said supply and governor pressure passages in said rotary member terminating in a pad surface of said disc portion; a valve body having a side face secured and sealed to said pad surface and having a small diameter stepped bore and a large diameter stepped bore located closely together and each stepped bore having a central axis parallel to a radius of the disc; both of said bores having a large radially inner portion and a smaller radially outer portion and extending the inner and outer sides of the body; said small stepped bore having an inlet port in the smaller portion, a regulated pressure port at the step and a vent port in the larger portion; said large bore having an inlet port in the smaller portion, a regulated pressure port at the step and a vent port in the larger portion; supply passage means in said valve body connecting said supply passage in said disc to said inlet port of the small bore; a transfer passage connecting said regulated pressure port of the small bore to the inlet port of the large bore; said parts being open at said side face and sealed by said pad portion; a passage connecting said regulated pressure port of the large bore to said governor port in said disc; a small diameter hollow valve member having a large and a small land fitting respectively said larger and smaller portions of said small bore and a groove therebetween operative for connecting said inlet port to said regulated pressure port and said regulated pressure port to said vent port; spring means and centrifugal force acting on said small valve element to bias said valve element to the opened position connecting said inlet port to said regulated pressure port and the regulated pressure acting on the unbalanced area between said lands to move said valve inwardly to connect said regulated pressure port to said vent port; a large diameter solid valve element having a small land in said smaller portion of said large bore and a larger land in the larger portion of said large bore; centrifugal force acting on said large valve element to move it outwardly to connect said inlet port to said regulated pressure port and the regulated pressure acting on the unbalanced area between said lands to move said valve to connect the regulated pressure port to said vent port.

8. In a control system; a source of fluid, valve body means mounted for rotation about an axis and having radial inner and outer sides and a plurality of substantially radially located stepped valve bores each extending completely through the valve body means from the radially inner to the radially outer side and being freely open to exhaust at both said sides and having an intermediate step portion, a large diameter bore portion extending from said step portion to the radially inner side and a small diameter bore portion extending from said step portion toward the radially outer side; said source being connected to one of said bores; a first valve element movable in said one bore having a large land and a small land fitting said large and small bore portions of said one bore and an intermediate step and responsive to centrifugal force for regulating fluid pressure in said step portion of said one bore acting on said step of said first valve element to oppose centrifugal force at a first governor pressure proportional to speed and supplying said first governor pressure to the other of said bores; a second valve element movable in said other bore responsive to centrifugal force and having a large land and a small land fitting said large and small bore portions of said other bore and an intermediate step and regulating fluid pressure in said step portion of said other bore acting on said step of said second valve element to oppose centrifugal force and supplying second governor pressure having a modified pressure speed relationship relative to said first governor pressure.

9. The invention defined in claim 8 and removable stop means detachably secured on said valve body to limit radial inward movement of said valve elements.

10. The invention defined in claim 8 and said first valve element being a light weight hollow valve element.

PO-1050
(5/69)

UNITED STATES PATENT OFFICE
CERTIFICATE OF CORRECTION

Patent No. 3,552,409  Dated January 5, 1971

Inventor(s) Raymond P. Michnay and Ivan R. Johnson

It is certified that error appears in the above-identified patent and that said Letters Patent are hereby corrected as shown below:

In the specification, column 3, line 34, "in" should be -- is --;
In the claims, claim 1, column 3, line 73, "an" should be -- and --; claim 7, column 5, lines 28 and 29, "and a governor pressure fluid passage in said fixed housing and member" has been repeated and therefore the second occurr should be deleted.

Signed and sealed this 13th day of May 1971.

(SEAL)
Attest:

EDWARD M. FLETCHER, JR.
Attesting Officer

WILLIAM E. SCHUYLER, JR
Commissioner of Patents